United States Patent [19]

Inagoya et al.

[11] Patent Number: 4,701,819
[45] Date of Patent: Oct. 20, 1987

[54] MAGNETIC HEAD TO EFFECT HIGH DENSITY MAGNETIC RECORDING

[75] Inventors: Osamu Inagoya; Hideo Fujiwara, both of Ibaragi; Takeshi Tottori, Toride; Minoru Yamano, Ibaraki; Noriyuki Kumasaka, Oume; Shigekazu Otomo, Sayama; Mitsuhiro Kudo, Tokyo; Juiti Morikawa, Katsuta; Kiyoshi Ishihara, Yokohama; Akira Usui, Ibaragi; Masashi Hayashi, Ibaragi, all of Japan

[73] Assignees: Hitachi Maxell, Ltd., Osaka; Hitachi, Ltd., Tokyo, both of Japan

[21] Appl. No.: 777,744

[22] Filed: Sep. 19, 1985

[30] Foreign Application Priority Data

Sep. 19, 1984 [JP] Japan .................................. 59-194874
Sep. 19, 1984 [JP] Japan .................................. 59-194875
Sep. 19, 1984 [JP] Japan .................................. 59-194876

[51] Int. Cl.⁴ ............................ G11B 5/22; G11B 5/42
[52] U.S. Cl. .................................... 360/122; 360/119; 360/120; 360/127
[58] Field of Search ..................... 360/122, 119–120, 360/123, 125–127

[56] References Cited

U.S. PATENT DOCUMENTS 4,152,741  5/1979  Mizuno et al. ...................... 360/119
4,559,572 12/1985  Kumasaka et al. ................. 360/110

FOREIGN PATENT DOCUMENTS 0125891  11/1984  European Pat. Off. ............ 360/122
56-124111  9/1981  Japan ................................. 360/122
56-124112  9/1981  Japan ................................. 360/122
56-169214 12/1981  Japan ................................. 360/122
58-155513  9/1983  Japan ................................. 360/122

Primary Examiner—John H. Wolff
Attorney, Agent, or Firm—Birch, Stewart, Kolasch & Birch

[57] ABSTRACT

A magnetic head having a pair of core halves each combined through a magnetic gap, each of the core halves comprising a core base having slanted side surfaces on the side opposing to the magnetic gap and a magnetic thin layer formed on the surfaces of the core base on the side opposing the magnetic gap with magnetic material of high saturation magnetic flux density, the minimum value of the sum of products of vertical cross sectional areas of the respective magnetic paths of each of the core halves except for the path of the magnetic gap and the respective saturation magnetic flux densities of the respective parts is greater than the product of the area of the magnetic gap and the saturation magnetic flux density of the magnetic thin layer.

11 Claims, 25 Drawing Figures

FIG. 14
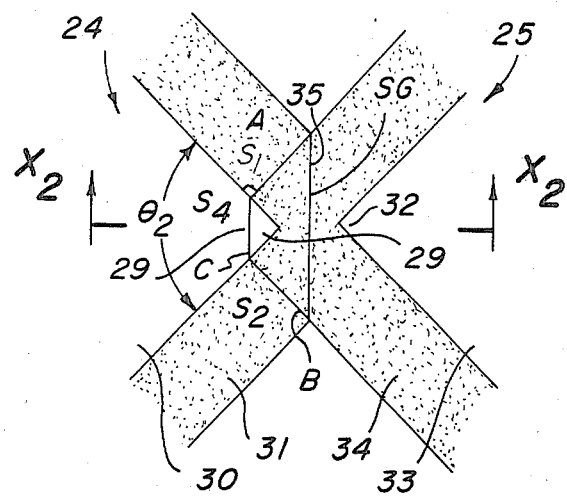
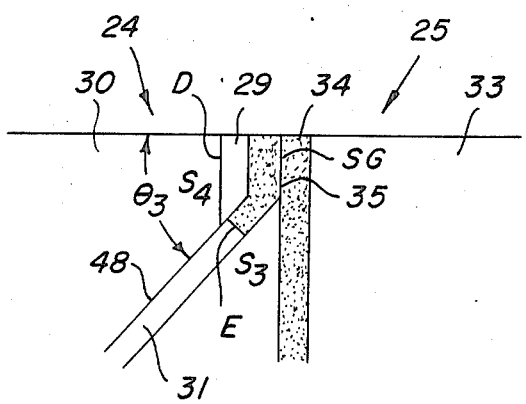
FIG. 15

FIG. 23
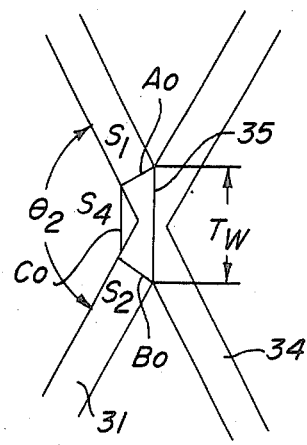
FIG. 24
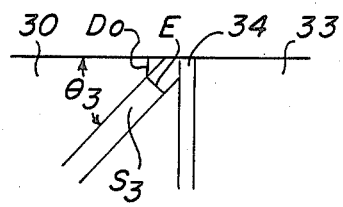
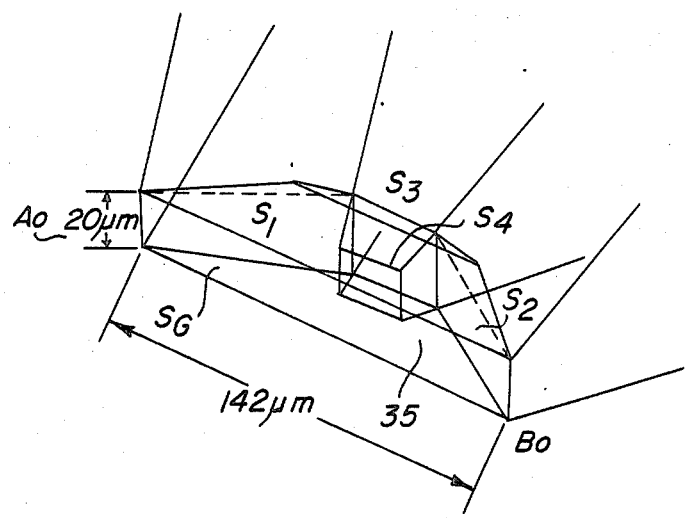
FIG. 25

MAGNETIC HEAD TO EFFECT HIGH DENSITY MAGNETIC RECORDING

BACKGROUND OF THE INVENTION

1. Field of the Invention

The present invention relates to a magnetic head.

With the increase of the recording density in a magnetic recording medium, the coercive force of the recording medium is increased. As magnetic heads for recording on the recording medium of the above kind, there have been proposed magnetic heads having core portions opposing the magnetic gap formed with high magnetic flux density materials.

In accordance with the present invention there is proposed a magnetic head half comprising a core base unit having a side face opposing the magnetic gap, the side face being slanted relative to the gap and a magnetic thin film made of magnetic materials of a high magnetic flux density, fitted on the side face of the core base unit opposing to the magnetic gap.

2. State of the Art

As shown in FIGS. 1, and 2 a proposed magnetic head comprises a first core half 1 and a second core half 2 and a coil 3 wound around the first core half 1. The first core half 1 and second core half 2 are made of ferrite and each of them is provided with a core base unit 5 with a projected portion 4 formed in the central part of the side surface opposing to the magnetic gap and a thin magnetic layer 6 made of high magnetic flux density material fitted on the respective side surface. As shown in FIG. 1, the projected part 4 of the first core half 1, the magnetic thin layer 6 and the projected part 4 of the second core half 2 are generally symmetrically disposed relative to the magnetic gap.

The magnetic head mentioned above is manufactured in such a manner as described below. As shown in FIG. 3, pairs of parallel groove 8 are formed on one face of a ferrite block 7 forming the core base 5 and tapered ribs 9 are formed between the grooves 8. The magnetic thin layer 6 is formed on the surface of the ferrite block 7 on which the grooves 8 and ribs 9 are formed in an uniform thickness by means of vaporizing or spattering with a high saturation magnetic flux density material. Subsequently, as shown in FIG. 5, a reinforcing layer 10 of a non-magnetic material is thickly made on the magnetic layer 6. The reinforcing layer is ground to the level shown by the dotted line. The sharp top part of the ribs 9 are ground so as to form the flat face 11. A coil slot 12 (FIGS. 2 and 8) is defined to a predetermined depth in a direction perpendicular to the rib 9. One block having the coil slot 12 and another block without a coil slot are assembled together by glass bonding so that the reinforcing layers 10 oppose each other as shown in FIG. 9. The block 7 is sliced along the dotted lines to provide magnetic heads. The magnetic heads, as mentioned above, are usually directed to the recording heads for a relatively narrow recording track of 10 μm width, such as VTR. In order to provide the magnetic heads for the narrow track, the top angle θ1 of the projected part 4 of the base 5 is defined by a small angle between 45° to 90°. With the small angle θ1, the error of the width of the flat portion 11 can be decreased even if the amount of the grinding of the tapered part of the magnetic layer 6 is changed during grinding of the magnetic layer 6 so that magnetic heads for forming the narrow recording track can be manufactured.

However, when the magnetic head mentioned above is used in a magnetic recording device for a magnetic disc with a relatively wide track width of 40 to 200 μm, the following problems occur.

In order to make the track width wide, it is necessary to increase the width of the flat portion 11 of the magnetic thin layer 6, therefore, the magnetic layer must be thick so long as the flat portion 11 is formed by grinding the tapered edge portion. When the angle θ1 of the projection 4 of the core base 5 is an acute angle, it takes a long time to form the magnetic layer 6, thereby decreasing the productivity of the magnetic heads and increasing the production cost. With the thin magnetic layer, the desired track width can not be obtained.

In addition in the prior art magnetic heads, since the coil slot 12 is defined after the magnetic layer 6 is formed on the ferrite block 7, the magnetic layer is eliminated at that part where the coil slot 12 is defined. Accordingly, the exciting magnetic flux developed by the current of the excitation coil 3 is introduced into the magnetic layer 5 through the core base 5 made of ferrite, thus the magnetic efficiency is reduced. Furthermore, in defining the coil slot 12 by machine cutting, the magnetic layer 6 is apt to be peeled from the core base 5 by the external force caused by the machine cutting thereby decreasing the yield of the magnetic heads.

Furthermore, it is proposed to define the thickness T of the magnetic layer 6 to be less than one half of the width of the flat part 11 which corresponds to the track width. This proposed arrangement decreases the thickness T of the magnetic layer 6, thereby causing the portion apart from the magnetic gap to be magnetically saturated prior to the magnetic saturation of the magnetic gap near the flat part 11. Accordingly, the advantage of employing a magnetic material of high magnetic flux saturation density is decreased.

Furthermore, in case the magnetic head is made for the VTR with the track width less than 10 μm, the thickness of the magnetic layer 6 must be less than 5 μm, which is difficult to form at a uniform thickness. If the magnetic layer has a fault, it causes magnetic saturation.

Also with the acute angle of the rib 9, crack or fault tend to occur in the tapered part of the rib when the first core half 1 and second core half 2 are manufactured. In order to avoid the crack as mentioned above, a magnetic core as shown in FIGS. 10 and 11 has been proposed.

The magnetic core shown in FIG. 10 is provided with a rib 53 having a rectangular shape in cross section at the end portion of the projection 52 of a core base 51 of a core half 50. A magnetic layer 54, similar to the magnetic layer 6, is formed in the side face of the projection 52 including the rib 53. In the magnetic head shown in FIG. 10, the mechanical strength of the rib 53 is weak and the rib 53 tends to be broken, therefore the yield of the magnetic head shown in FIG. 10 is low.

The magnetic core shown in FIG. 11 is provided with relatively wide flat parts 61 and 62 having a width t at the end of projected parts 59 and 60 of the core bases 57 and 58 of the core halves 55 and 56. The thickness of magnetic layers formed on the flat parts 61 and 62 is thinner than the magnetic layers 63 and 64 formed on the other parts while 65 denotes a magnetic gap. In the magnetic head shown in FIG. 11, the end portions of the projections 50 and 60 near the magnetic gap 65 are easily saturated and the magnetic head shown in FIG. 11 can not be used.

SUMMARY OF THE INVENTION

An essential object of the present invention is to provide a magnetic head having a good magnetic characteristic.

Another object of the present invention is to provide a magnetic head which is able to prevent occurrence of cracks and breakage of a portion of the head near the magnetic gap during process of manufacturing the magnetic head.

Still a further object of the present invention is to provide a magnetic head in which an advantage of using magnetic material of high saturation magnetic flux density can be exhibited effectively.

Yet another object of the present invention is to provide a magnetic head in which the amount of magnetic flux flowing in the magnetic path containing the magnetic gap can be increased.

In order to accomplish the objects, according to the present invention, there is provided a magnetic head having a pair of core halves each combined through a magnetic gap, each of the core halves comprising a core base having slanted side surfaces on the side opposing to the magnetic gap and a magnetic thin layer formed on the surfaces of the core base on the side opposing to the magnetic gap with magnetic material of high saturation magnetic flux density, characterized in that the minimum value of sum of the products of vertical cross sectional areas of the respective magnetic paths of each of the core halves, except for the path of the magnetic gap and the respective saturation magnetic flux densities of the respective parts, is greater than the product of the area of the magnetic gap and the saturation magnetic flux density of the magnetic thin layer.

BRIEF EXPLANATION OF THE DRAWINGS

FIG. 14 is a partial front view showing around the magnetic gap of the magnetic head shown in FIG. 12, FIG. 15 is a partial cross sectional view showing around the magnetic gap of the magnetic head taken along the lines X2—X2 shown in FIG. 14, FIG. 23 is a partial plan view showing the region near the magnetic gap of the magnetic head according to the present invention, FIG. 24 is a partial side view of FIG. 23, and FIG. 25 is a partial perspective view of the magnetic head according to the present invention.

DETAILED DESCRIPTION OF THE INVENTION

Figure 12:
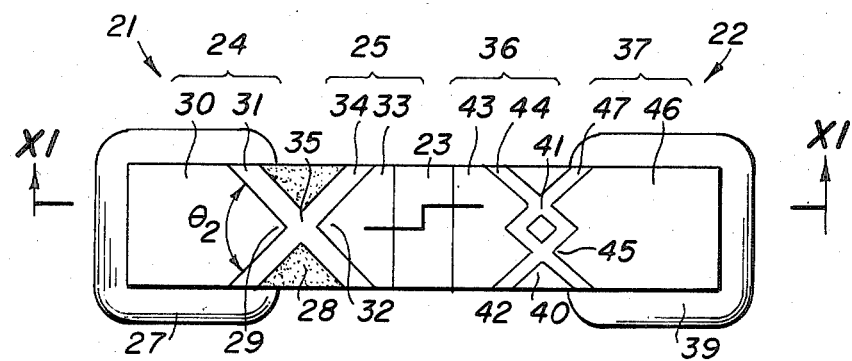
FIG. 12 is a front view showing an embodiment of a magnetic head according to the present invention.

Referring to FIG. 12, a composite magnetic head for use in a magnetic disc recording and reproducing device (referred to as a magnetic disc player hereinafter) is provided with a recording and reproducing head 21, an erasing head 22 and a magnetic barrier 23 made of non-magnetic material disposed between both heads 21 and 22 so as to prevent undesired magnetic interference between both heads 21 and 22. The composite magnetic head is mounted in the magnetic disc player in such a manner that the recording and reproducing head 21 is at the upper stream side of the rotation of a magnetic disc in the magnetic disc player with the erasing head 22 located at the lower stream side.

The recording and reproducing head 21 generally comprises a first core half 24, a second core half 25 disposed opposite to the first core half 24 and an exciting coil 27 wound on the first core half 24 passing a coil slot 26 defined on the first core half 24. Reinforcing members 28 made of non-magnetic material such as glass are disposed near the regions where the first core half 24 and second core half 25 contact together.

The first core half 24 is composed of a first core base 30 having a projected part 29 formed centrally on the side which faces to a magnetic gap 35 and a first magnetic thin layer 31 laid on the surface of the side facing to the magnetic gap 35.

The first core base 30 is made of ferrite of high permeabilty such as manganese zinc ferrite or nickel zinc ferrite. The first thin magnetic layer 31 is made of a crystalline alloy or amorphous alloy of high saturation magnetic flux density and high permeability. As the crystalline alloy, iron-aluminum-silicon alloy, iron-silicon alloy and iron-nickel alloy may be used. As the amorphous alloy, an alloy of one or more elements selected from the group consisting of iron, nickel and cobalt and one or more elements selected from the group consisting of phosphorus, carbon, boron, silicon, an alloy having mainly this alloy and additionally one or more elements selected from the group consisting of aluminum, germanium, beryllium, tin, molybudenum, indium, tangsten, titanium, manganese, chromium, zirconium, hafnium and niobium and an alloy having mainly cobalt or zirconium to which these said elements are added, may be used.

The second core half 25 is also composed of a second core base 33 made of ferrite of high permeability, having a projection 32 formed on the side opposite to the magnetic gap 35 and a second magnetic thin layer 34 having high saturation magnetic flux density and high permeability and formed on the surface of the side which opposes the gap 35. As shown in FIG. 12, the projected part 29 of the first core half 24, and the first thin magnetic layer 31 and the projected part 32 of the second core half 25, and the second thin magnetic layer 34 are substantially symmetrical relative to the magnetic gap 35 in the region near the contact area. The magnetic gap 35 is about 100 to 150 μm long. This length corresponds to the track width of the magnetic head.

The erasing head 22 comprises a first core half 36, second core half 37 and an excitation coil 39 wound around the second core half 37 through a coil slot 38. Reinforcing members 40 are disposed near the contacting area of the first core half 36 and second core half 37.

The end angle $\theta_2$, which is the angle between both slanted surfaces of the projected part 29 of the first core base 30 is greater than 90° but smaller than 150°. In case the end angle is smaller than 90°, that is an acute angle, in the process of forming the magnetic thin layer 31 on the surfaces of the projected part 29 by spattering or vaporizing, the angle of the slanted surface of the projected part against the target which forms the magnetic thin layer 31 is so large that it takes too much time for forming a thick magnetic layer, therefore, the productivity is low. In case the end angle $\theta_2$ is an acute angle, there tends to occur breakage of the portion of the projected part in the process of cutting to form the projected end, thereby reducing yields. On the other hand, in case the end angle is greater than 150°, the end portion of the projected part becomes nearly a flat surface, whereby a suspected magnetic gap is formed in the region near the slanted surface to reduce the recording and reproducing characteristics. Accordingly, in order to prevent occurrence of the partial breakage of the projected part and to produce the magnetic thin layer 31 having a desired thickness with a high productivity, avoiding formation of the suspected magnetic gap, the end angle $\theta_2$ must be within about between 90° and 150°.

The definition of the end angle in the projected parts may be applicable to not only the first core half 24 but also second core half 25 and the first and core halves 36 and 37 of the erasing head 22.

Figure 13:
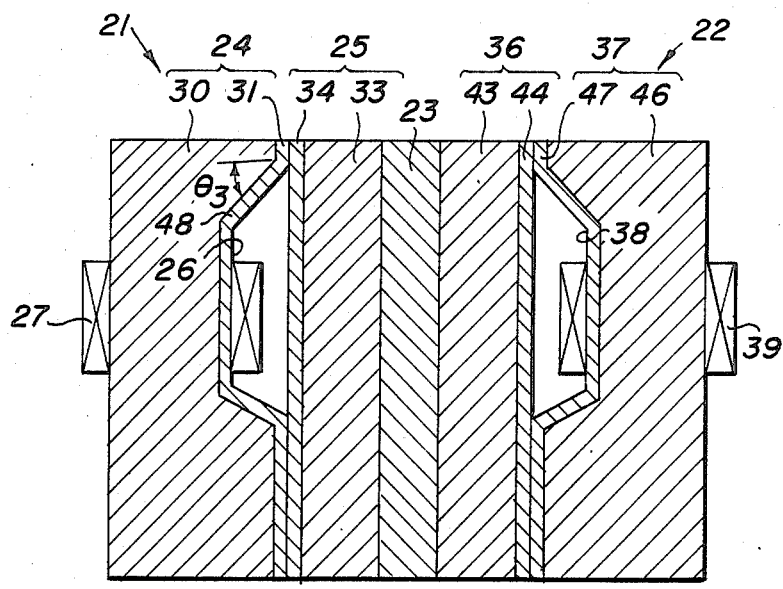
FIG. 13 is a cross sectional view of the magnetic head taken along the lines X1—X1 in FIG. 12.

The coil slots 26 and 38 are formed in the manner different from the conventional manner as described below. Prior to forming the magnetic thin layers 31 and 47, the coil slots 26 and 38 are formed counting on the thickness of the magnetic thin layers 31 and 47. Then the magnetic thin layers 31 and 47 are formed. This method enables the forming of the magnetic thin layers 31 and 47 continued from the top to the bottom, as shown in FIG. 13, without interrupted by the coil slots 26 and 38.

Referring to FIG. 14, the sum of a first product between the cross sectional area of the region perpendicular to the direction of the flow of the magnetic flux flowing the first core base 30 except for the magnetic gap 35 and the saturation magnetic flux density of the first core base 30 and a second product of the cross sectional area of the region perpendicular to the direction of the flow of the magnetic flux flowing the first magnetic thin layer 31 and the saturation magnetic flux density of the first magnetic thin layer 31 can become minimum at the positions A, B, C, D and E. That is, the position A is shown by the line A drawn perpendicular to one of the slanted surface of the projected part 29, the position B is shown by the line B drawn perpendicular to another slanted surface of the projected part 29, the position C is shown by the line C connecting between a point on the line A and another point on the line B, the position D is shown by the line D drawn perpendicular to the surface of the magnetic head from the line C and the position C is shown by the line E drawn perpendicular to the first magnetic thin layer 31 of the slanted surface 48 from the line D.

As the result of study of the thickness of the first magnetic thin layer 31 of the first core base 30, it has been found that the advantage of using the material of high saturation magnetic flux density can effectively be exhibited when the magnetic thin layer is arranged to comply with the relation as hereinafter described.

Assuming that the cross sectional area taken along the line A as shown in FIGS. 14 and 15 is S1, the cross sectional area taken along the line B is S2, the cross sectional area taken along the line E is S3, the cross sectional area taken along the lines C and D is S4 and the area of the surface of magnetic thin layer 31 facing the magnetic gap is SG, the saturation magnetic flux density of the first core base 30 is BS1 and the saturation magnetic flux density of the magnetic thin layer 31 is BS2, the first core base 30 and the first magnetic thin layer 31 are formed so as to satisfy the following equation, $$(S1+S2+S3)\ BS2+S4\ BS1 \geqq S6\ BS2 \qquad (1).$$

In the position where the sum of the first product of the cross sectional area perpendicular to the flow of the magnetic flux in the magnetic thin layer 31 and the saturation magnetic flux density and the second product of the cross sectional area perpendicular to the flow of the magnetic flux in the core base 30 and the saturation magnetic flux density of the core base 30 becomes minimum, by forming the core base 30 and the magnetic thin layer 31 so that said sum of the first product and the second product is larger than the third product of the opposite surface of the magnetic gap and the saturation magnetic flux density, it can be prevented that the portion away from the magnetic gap of the magnetic thin layer is saturated prior to the saturation of near the magnetic gap, whereby the advantage of using high saturation magnetic flux density material can be exhibited and an excellent magnetic characteristic can be expected.

A specific example of the magnetic head of the present invention is listed herein with reference to FIGS. 23 to 25. Assuming that Tw is 142 μm, SG=2840 μm², AO=BO=45 μm, CO=64 μm, DO=19 μm, and EO=41 μm, the areas S1 through S4 and BS1 and BS2 are as follows. S1=S2=839 μm², S3=4860 μm², S4=1220 μm² and BS1=5000 gauss and BS2=9500 gaus.

According to the equation (1), $S1+S2+S3+S4\ (BS1S/BS2) \geqq SG$. By placing the numercal values as assumed above, the following calculation is obtained. 2×839+4860+1220 (5000/9500)=1678+4860+640 ≧2840.

In this case, in order to form the magnetic thin layer 31 effectively, the angle $\theta_3$ of the slanted surface of the side of the slot is greater than 45° preferably within 45° to 80°. This arrangement enables to form the magnetic thin layer 31 of the desired thickness in a short period.

Figure 16:
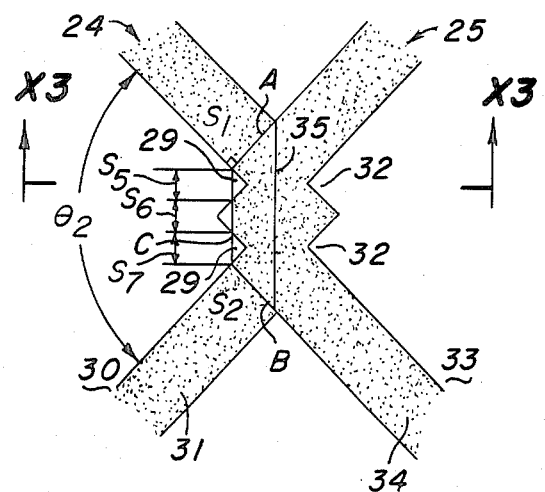
FIG. 16 is a partial front view of a modification around the magnetic gap.
Figure 17:
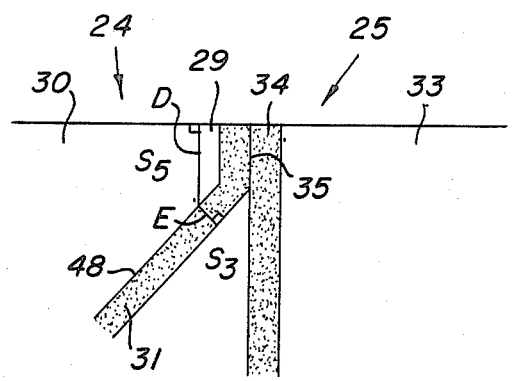
FIG. 17 is a partial cross sectional view taken along the lines X3—X3 in FIG. 16.

Referring to FIGS. 16 and 17 showing another embodiment of the present invention, which is suitable to extend the length of the magnetic gap 35 i.e., the track width. In the embodiment, projected parts 29 of the first core base 30 and the projected parts 32 of the second core base 33 are provided more than two, and the first magnetic thin layer 31 and the second magnetic thin layer 34 are formed on the projected parts 29 and 32.

In this embodiment, the sum of a first product between the cross sectional area of the region perpendicular to the direction of the flow of the magnetic flux flowing the first core base 30 except for the magnetic gap 35 and the saturation magnetic flux density of the first core base 30 and a second product of the cross sectional area of the region perpendicular to the direction of the flow of the magnetic flux flowing the first magnetic thin layer 31 and the saturation magnetic flux density of the first magnetic thin layer 31 can become minimum at the positions A, B, C and D as shown in FIGS. 16 and 17.

Assuming that the cross sectional area taken along the line A as shown in FIGS. 16 and 17 is S1, the cross sectional area taken along the line B is S2, the cross sectional area taken along the line E is S3, the cross sectional areas taken along the line C are S5 and S7, and the area of the surface of magnetic thin layer 31 cut along the line C is S6, the area of the magnetic thin layer facing the magnetic gap is SG, the saturation magnetic flux density of the first core base 30 is BS1 and the saturation magnetic flux density of the magnetic thin layer 31 is BS2, the first core base 30 and the first magnetic thin layer 31 are formed so as to satisfy the following equation, $$(S1+S2+S3+S6)\ BS2+(S5+S7)\ BS1 \geqq SG\ BS2 \qquad (2).$$

In order to manufacture the magnetic heads satisfying the equations (1) and (2) easily, the end angle $\theta 2$ is selected within about 90° to 150°.

The embodiments mentioned above are the magnetic heads using the core base made of the magnetic material such as manganese-zinc ferrite, the core base may be formed of non-magnetic ferrite or ceramics so that the magnetic thin layer is formed thereon. In this case the value BS1 in the equation (1) is zero.

In the embodiments described above, the magnetic thin layer is formed on both faces of the projected part, the opposing faces of the magnetic gap, and the side faces of the coil slots, the present invention is not limited to the above arrangement, for example, the magnetic thin layer may be formed only on the surfaces of the magnetic gap and the side faces of the coil slots.

Also the present invention may be applied to the other core half or halves.

As mentioned above, according to the present invention, the good characteristic of the magnetic thin layer of high saturation magnetic flux density can be exhibited by making the magnetic thin layer with a suitable thickness, satisfying the equations (1) or (2), in case the magnetic thin layer is too thick, there occurs a magnetic loss due to eddy current and the productivity may be lowered.

Figure 22:
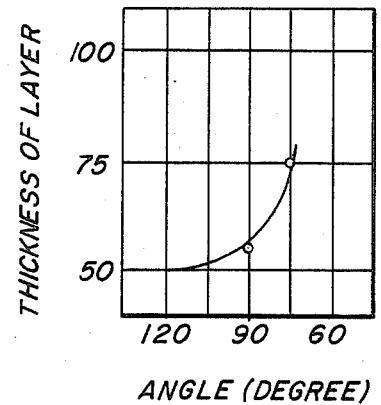
FIG. 22 is a graph showing the relation between the angle of the tapered part of the projection and the necessary thickness of the magnetic film.

The relation between the thickness of the magnetic thin layer and the angle $\theta 2$ between the tapered surfaces of the projected part was examined and the result thereof is shown in FIG. 22. As apparent from FIG. 22, there is a relation between the end angle $\theta 2$ and the thickness of the magnetic thin layer for exhibiting the advantage of the material of high saturation magnetic flux density. From FIG. 22, it can be said that in case the end angle $\theta 2$ is smaller than 90°, it is necessary to make the magnetic thin layer thick, however, in case the end angle $\theta 2$ is greater than 90° the function of the magnetic thin layer of high saturation magnetic flux density can exhibited with the decreased thickness of the magnetic thin layer, so that even if the magnetic material of the same high flux density is used, the magnetic flux passing the magnetic thin layer can be increased.

Figure 18:
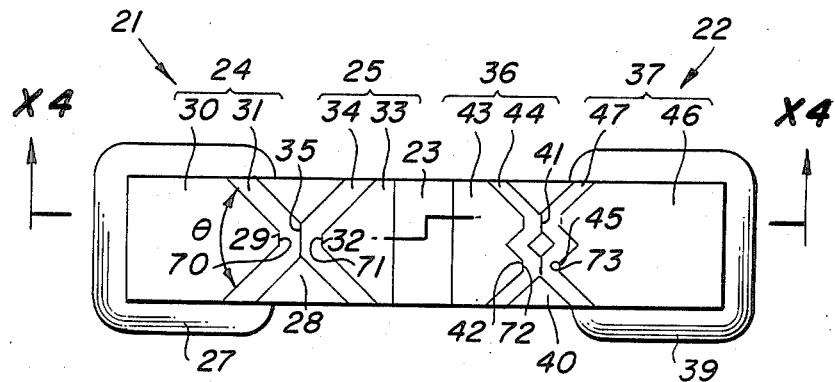
FIG. 18 is a front view showing another embodiment of the magnetic head according to the present invention.
Figure 19:
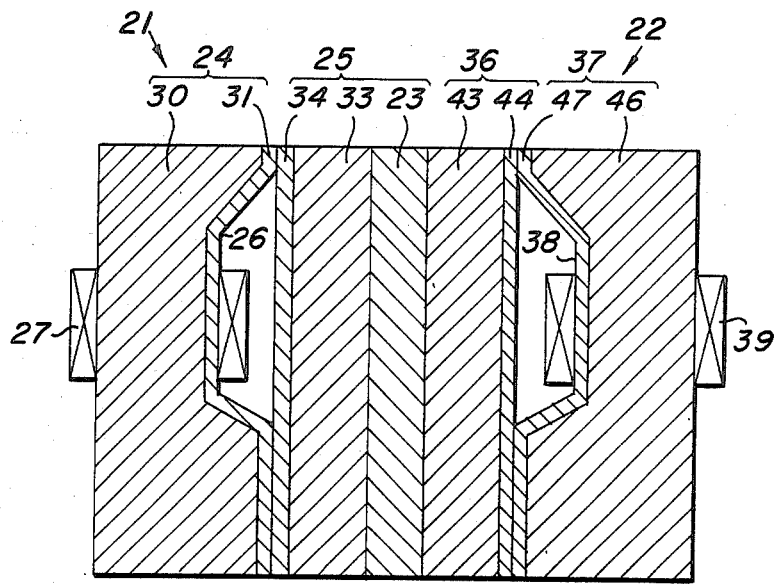
FIG. 19 is a cross sectional view taken along the lines X4—X4 in FIG. 19.

FIGS. 18 and 19 show a further embodiment of the present invention, wherein like parts in FIGS. 12 and 13 are designated by like reference numerals. In this embodiment, there is formed a small flat surface 70 with about 15 $\mu$m width in the end portion of the projected part 29 of the first core base 30 forming the first core half 23 without forming a suspected magnetic gap. There are formed respective flat surfaces 71, 72 and 73 with small width in the end portion of the projected part 32 of the second core base 33 forming the second core half 25 and the end portion of the projected part 42 of the first core base 43 of the erasing head 22 and the end portion of the projected part 45 of the second core base 46.

The magnetic thin layers 31, 34, 44 and 47 are formed on the whole side surfaces of the projected parts 29, 32, 42, 45 including flat parts 70, 71, 72 with a uniform thickness similar to the embodiment shown in FIGS. 16 and 17. The remaining parts are formed similar to the embodiment shown in FIGS. 12 and 13.

Figure 20:
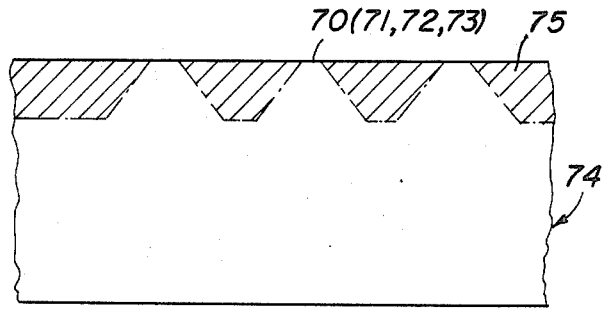
FIG. 20 is a schematic diagram showing around the magnetic gap of the magnetic head shown in FIG. 12.
Figure 21:
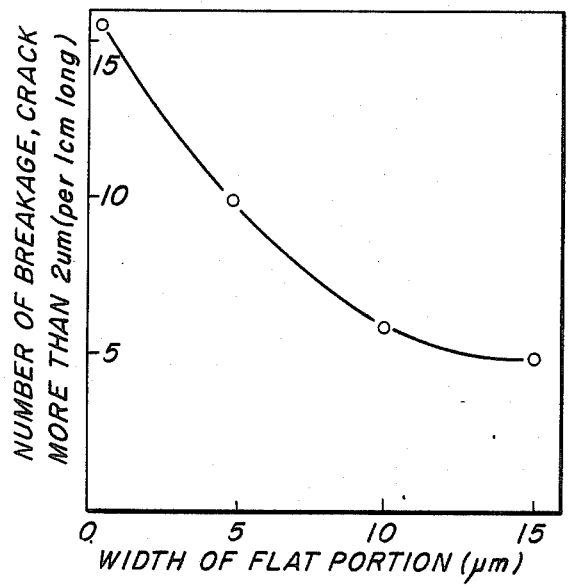
FIG. 21 is a graph showing the relation between the width of the flat part of the magnetic head and the number of cracks and breakage of the magnetic head.

The first core base 30 of the first core half 24, the second core base 33 of the second core half 25, the first core base 43 of the first core half 36 and second core base 46 of the second core half 37 of the erasing head 22 are respectively cut at the shaded portions in FIG. 20 so that the side faces 75 of the ferrite block 74 form the flat portions 70, 71, 72 and 73.

Figure 1:
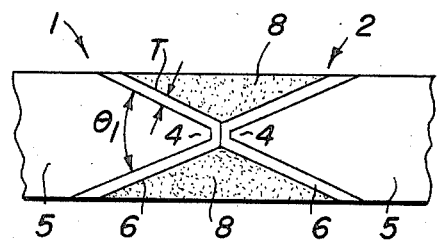
FIG. 1 is a partial front view of a conventional magnetic head.
Figure 2:
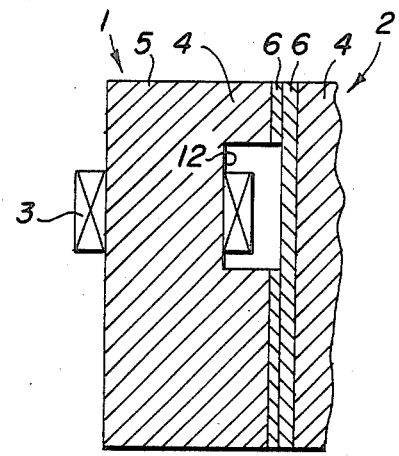
FIG. 2 is a partial cross sectional view of the magnetic head shown in FIG. 1.
Figure 3:
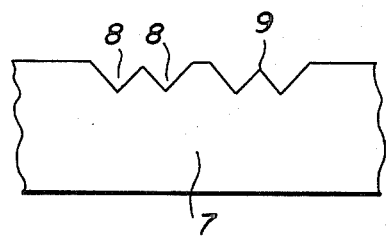
FIGS. 3 to 6 are partial side views showing processes of making the magnetic head shown in FIG. 1, FIGS. 7 and 8 are perspective views showing the processes of making the magnetic head shown in FIG. 1.
Figure 4:
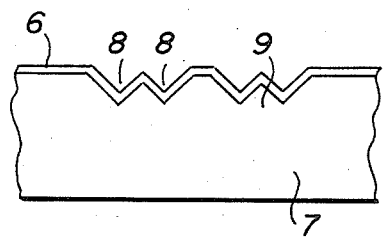
Figure 5:
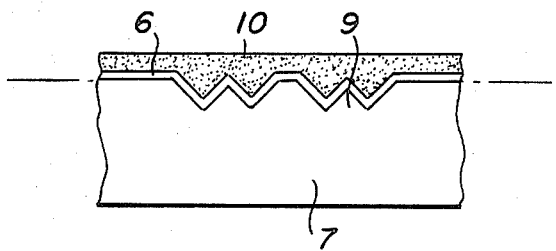
Figure 6:
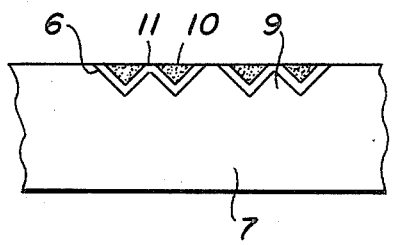
Figure 7:
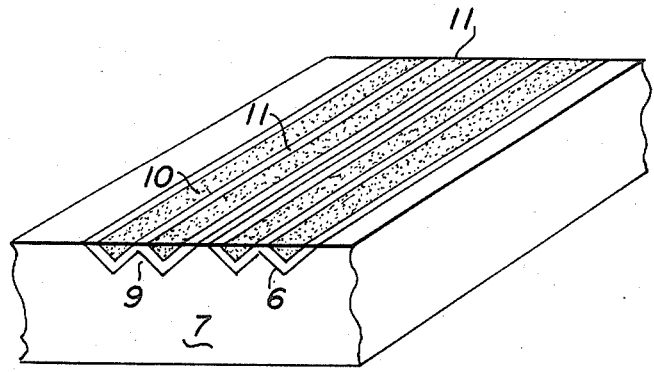
Figure 8:
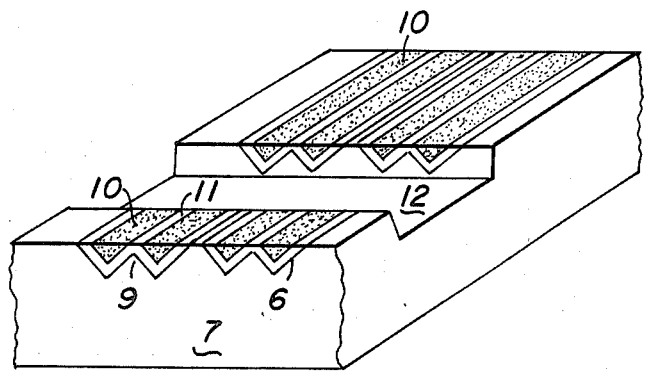
Figure 9:
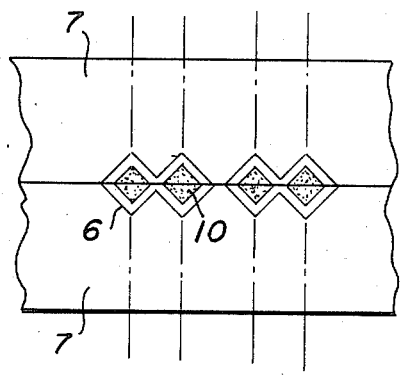
FIG. 9 is a front view of the magnetic cores produced by the processes shown in FIGS. 3 to 8.
Figure 10:
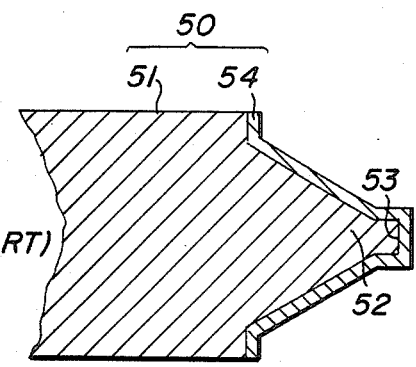
FIG. 10 is a partial cross sectional view showing another example of a conventional magnetic core.
Figure 11:
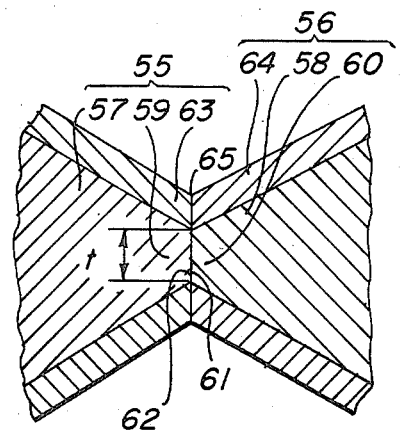
FIG. 11 is a partial cross sectional view showing a further example of a conventional magnetic core.

In the embodiment described above, since the flat portions 70, 71, 72 and 73 with 15$\mu$ wide are formed at the projected parts of the respective core bases 30, 33, 43 and 46, the frequency of occurrence of the breakage and cracks larger than 2 $\mu$m per 1 cm long of the projected parts can be decreased to $\frac{1}{3}$ compared with the conventional way as shown in FIGS. 1 and 2. As the width of the flat portions 70, 71 72 and 73 is about 15 $\mu$m for preventing formation of any suspected magnetic gaps, a good magnetic characteristic can be obtained. It is an advantage of the present invention that the function of the magnetic thin layer can be effectively exhibited by making the angle $\theta 2$ of the projected part more than 90° and enables to make the magnetic thin layer as thin as possible, whereby the loss of the head due to eddy current.

The magnetic head according to the present invention is useful for the magnetic head having the magnetic gap more than 30 $\mu$m long.

What is claimed is:

1. A magnetic head comprising a pair of core halves with sides combined with each other through a magnetic gap, each of said core halves comprising a core base having a projecting portion at said respective sides opposing said magnetic gap with slanted surfaces formed on said projecting portions opposing said magnetic gap and a thin magnetic layer formed on said slanted surfaces of said core base opposing said magnetic gap of a magnetic material of high saturation magnetic flux density and having a track width of 40 to 200 $\mu$m, wherein at least one of said core halves comprises a coil slot with said thin magnetic layer formed on an inner surface thereof, and the thickness of said thin magnetic layer is defined in such a manner that a minimum value of the total of the product of the cross sectional areas perpendicular to the direction of the magnetic flux of the opposing portions of the respective core halves, except for the magnetic gap forming the magnetic circuit, and the saturation magnetic flux density of said respective portions is greater than the product of the area of the surface of the respective core halves in the magnetic gap and the saturation magnetic flux density of said thin magnetic layer.

2. The magnetic head according to claim 1, wherein the thickness of the thin magnetic layer on the lines A, B and E is defined to satisfy the following equation:
$$(S1+S2+S3) BS_2 + S4\ BS_1 \geq S_G\ BS_2$$

wherein S1, S2, S3 and S4 are respectively the cross sectional areas of the portions taken along the lines A, B, C, D and E $S_G$ the area of the surface of the thin magnetic layer opposing to the magnetic gap, $BS_1$ the saturation magnetic flux density of the core bae and $BS_2$ and the saturation magnetic flux density of said thin magnetic layer.

3. The magnetic head according to claim 2, wherein the track width ranges from 100 to 140 μm.

4. The magnetic head according to claim 2, wherein the angle between said slanted surfaces of the projecting portion provided in said core base ranges from 90° to 180°.

5. The magnetic head according to claim 1, wherein the thickness of the thin magnetic layer on the lines A, B and E is defined to satisfy the following equation:
$$(S1 +S2+S3+S6)BS_2+S5+S7)\ BS_1 \geq SG\ BS_2$$

wherein S1, S2, S5, S6, S7 and S3 are respectively the cross sectional areas of the portions taken along the lines A, B, C, and D shown $S_G$ the area of the surface of the thin magnetic layer opposing to the magnetic gap, $Bs_1$ the saturation magnetic flux density of the core base and $Bs_2$ the saturation magnetic flux density of said thin magnetic layer.

6. The magnetic head according to claim 1, wherein said core base is formed of ferrite of high permeability.

7. The magnetic head according to claim 6, wherein the thin magnetic layer is formed of a magnetic material of high saturation magnetic flux density and high permeability.

8. The magnetic head according to claim 7, wherein said core base is formed of manganese-zinc ferrite and said thin magnetic layer is formed of an amorphous alloy containing mainly cobalt and zirconium.

9. The magnetic head according to claim 1, wherein said track width of said magnetic head ranges from 100 to 150 μm.

10. The magnetic head according to claim 1, wherein the angle between said slanted surfaces of said core base ranges from 90° to 150°.

11. The magnetic head according to claim 1, wherein the end portion of at least one of said projecting portions is flat having a width of less than 15 μm.

* * * * *